(No Model.) 2 Sheets—Sheet 1.
E. A. BLAKE.
STEREOTYPE SHAVING MACHINE.
No. 347,223. Patented Aug. 10, 1886.
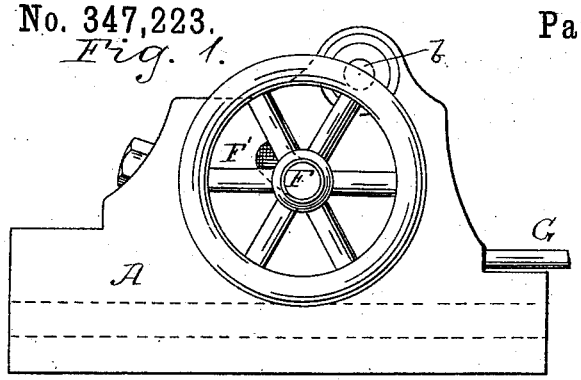
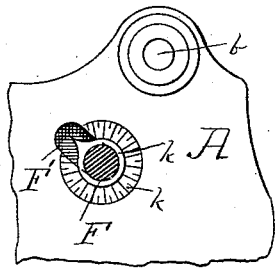
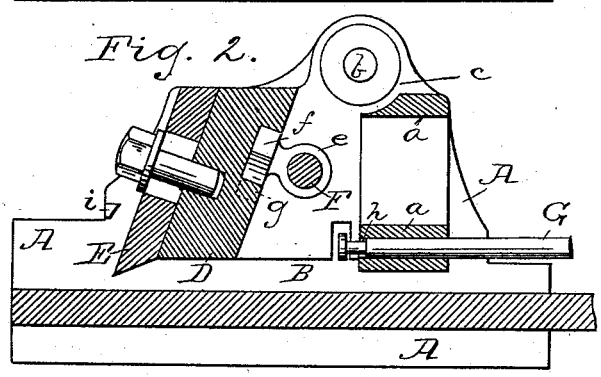
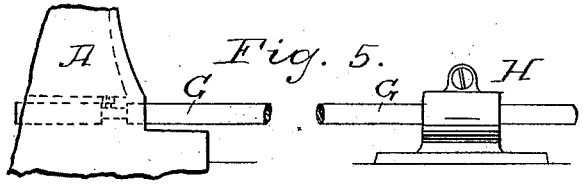
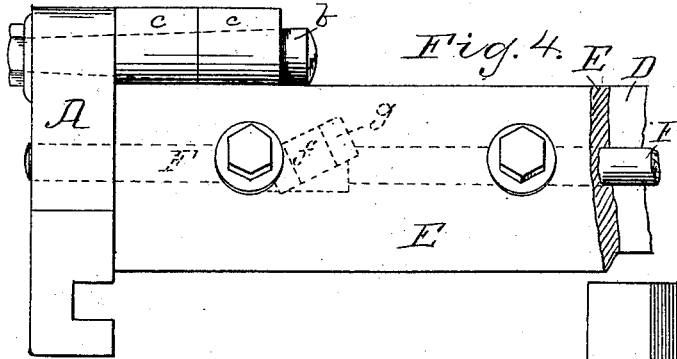
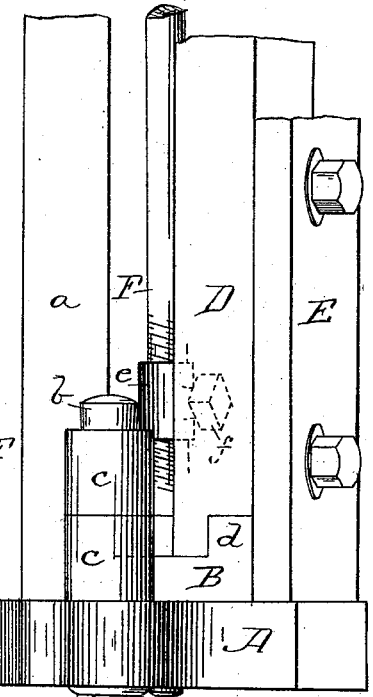
Witnesses:
Edward W. Schirach
Frank D. Thomason
Inventor:
Edward A. Blake
by James N. Coyne
atty (No Model.) 2 Sheets—Sheet 2.

E. A. BLAKE.
STEREOTYPE SHAVING MACHINE.

No. 347,223. Patented Aug. 10, 1886.

Witnesses:
Edward W. Schrach.
Frank D. Thomason

Inventor:
Edward A. Blake.
by James H. Coyne
atty

UNITED STATES PATENT OFFICE.

EDWARD A. BLAKE, OF CHICAGO, ILLINOIS.

STEREOTYPE-SHAVING MACHINE.

SPECIFICATION forming part of Letters Patent No. 347,223, dated August 10, 1886.

Application filed December 11, 1885. Serial No. 185,330. (No model.)

*To all whom it may concern:*

Be it known that I, EDWARD A. BLAKE, of Chicago, in the county of Cook and State of Illinois, have invented certain new and useful Improvements in Stereotype-Shaving Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to make such improvements in the knife-carrier heads of stereotype-shaving machines that the knife can be adjusted vertically accurately, so that its cutting-edge is parallel with the plane of the bed-plate, and expeditiously, without the necessity of manipulating the bolts which secure the knife to said head.

Another object of my invention is to make the knife-carrying frame oscillatory, so that it will automatically lift the knife from the work when the knife makes its return movement.

Figure 6:
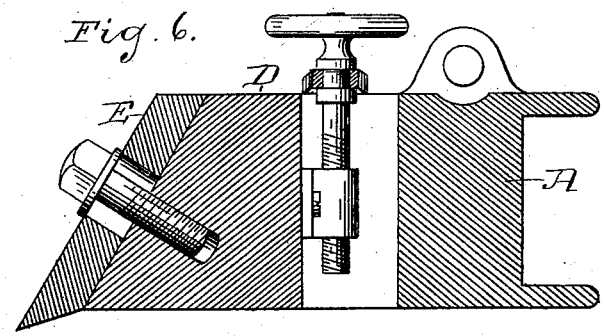
Figure 7:
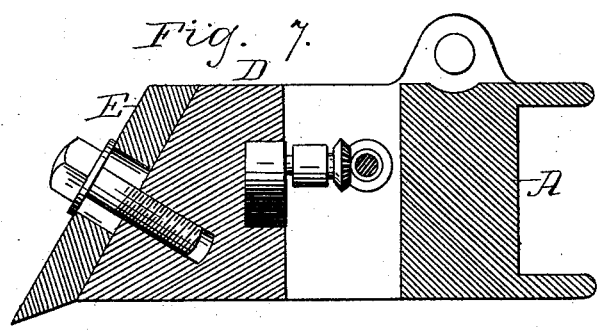
Figure 8:
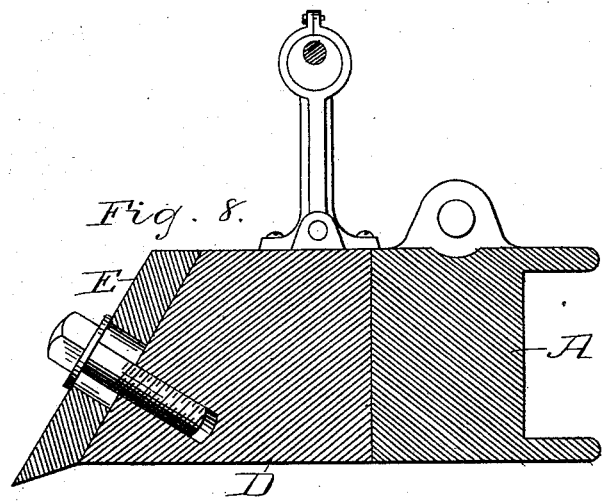

In the drawings, Figure 1 shows a side elevation of my invention. Fig. 2 is a longitudinal vertical section. Fig. 3 is a plan view of one-half the length of the head. Fig. 4 is front elevation of the same. Fig. 5 is a detail view showing a modification of the devices for automatically oscillating the head. Figs. 6, 7, and 8 show modifications of my invention for obtaining the vertical adjustment of the knife.

With the exception of the knife-carrier head, the construction of the stereotype-shaver may or may not be the same as that commonly used, and it matters not, so far as its efficacy is concerned, whether the machine is operated by hand-power or by steam-power.

Reference being had to the drawings, A A are the side frames of the carrier-head, constructed of the usual shape, so as to slide longitudinally on the beveled sides of the bed-plate. They are connected by suitable bridges, *a a*, near their rear ends, above the bed-plate, as shown. These side frames, A, are provided near their upper edges, a little to the rear of their centers of length, with bearings *b'*, for the reception of the fulcrumal pins *b*. Fulcrumed on these pins *b*, by means of knuckles *c c*, between frames A are the oscillating frames B B. These oscillating frames are beveled vertically about the angle the knife is usually placed at, and have lateral flanges *d* projecting from said edges toward each other. The flanges *d* enter corresponding rabbets in the knife-head D, and the latter has its front surface beveled correspondingly to the beveled edges of the oscillating frames, which are in alignment therewith. The head D is provided with bolt-holes, and the knife E is secured to said beveled surface (overlapping the flanges *d d* of the oscillating frame) by means of bolts passing through vertically-elongated holes therein. Frame D, to which the knife is secured, is held so that it can be vertically adjusted by means consisting of a transverse screw-threaded shaft, F, journaled in suitable bearings in the frames A, and having a hand-wheel at one end, by which it can be manipulated. On this shaft are placed two or more tapped bosses, *e e*, which have short necks projecting from them, with square heads *f* on their ends. These heads enter correspondingly-oblique recesses *g* in the rear surface of the knife-frames. Thus as the shaft is turned one way or the other the bosses move longitudinally thereon, and by reason of the heads *f* move the knife-frame up or down. It is desirable when the knife makes its return movement that it should oscillate automatically, so as to lift the knife from the work, and so that the work can, when desired, be removed from the front of the machine, instead of from the rear, as heretofore. This is accomplished by providing the bridges with horizontal longitudinal bearings *h*, for the reception of the reciprocating rods G. The forward end of these rods is provided with a head which enters suitable recesses in the oscillating frame, and the rear ends pass through suitable bearings, H, secured, with reference to the rods, to the bed-plate beyond range of the return-stroke of the head. These bearings are provided with a leather bushing or packing, which creates great friction when the rods are moved longitudinally, so that when the carrier-head commences its return movement the rods will not move until they have oscillated the frame D until stopped by the stop $i$; then they will be urged back through the rear bearings.

I do not deem it absolutely necessary that the frame D should oscillate. It may, then, be only adjustable vertically. In this case the pivotal pins and their bearings, as well as the oscillating frames, may be dispensed with.

Another device for giving a vertical adjustment to the knife-frame is shown in Fig. 6. In this modification a frame bridges over the side frames, A A, and a lifting-screw passes vertically down into the knife-frame or through a boss connected thereto. Thus by manipulating the screw by means of a hand-wheel on its upper end the knife can be adjusted vertically.

In Fig. 7 is shown how the transverse shaft may, instead of bosses, &c., have a beveled pinion on it which meshes with a similar gear on the end of a short shaft, which has bearings in a lug, say, secured to the frames A. The opposite end is provided with a cam which, entering a corresponding recess, lifts or lowers the frame D as it turns.

Fig. 8 illustrates yet another way of lifting the knife-frame. In this a transverse shaft is placed above the knife-frame, which is journaled in suitable frames rising from the oscillating frame, or from side frame, A, (according as it is desired to oscillate the knife-carrying frame,) and which is provided with a hand-wheel at one end with which to manipulate it. On this shaft are eccentrics which, by means of eccentric-rods, lift or lower frame D as the transverse shaft is turned. If desired, the head may be made so as to oscillate; but the means for automatically oscillating it when the carrier-head makes the return-stroke can be omitted.

While it is not necessary, there may be an index made in the circumference of the shaft just outside of the frame A, and a graduated dial concentric to the bearing of the shafts or screw of the knife-frame-adjusting devices, to enable the operator to adjust the head without the necessity of placing the work on the bed-plate for that purpose, is shown in Fig. 5ª.

I do not wish to be confined to any particular means for accomplishing the vertical adjustment of the knife-frame, for such a proposition having been made known can be effected in a number of ways which would only require the exertion of mechanical skill; nor do I wish to be confined to the frame D for the accomplishment of the vertical adjustment of the knife to an oscillating-knife frame, for this, evidently, can be accomplished with or without the use of such a frame. Again, while not desirable, the vertical adjusting devices for the knife could be omitted, and the oscillating frame would operate to perform its functions—namely, to oscillate when making the return-stroke—so as to lift the knife from the work, or to enable the operator to oscillate the knife upward, so as to remove the work from the front of the machine, instead of the rear, as the case usually is now.

What I claim as new is—

1. In a stereotype-shaving machine, the combination, with a knife-carrying head, of a transverse knife between the side frames of said head, and means for adjusting said knife vertically without recourse to the bolts holding said knife to said head.

2. In a stereotype shaving machine, the combination, with a knife-carrying head, of a transverse knife between the side frames of said head, having an oscillatory motion, and means for adjusting said knife vertically.

3. In a stereotype shaving machine, the combination, with the knife-carrying head, of the transverse knife E between the side frames of said head, knife-frame D, to which said knife is secured, and means for giving a vertical adjustment to said knife-frame or knife.

4. In a stereotype-shaving machine, the combination, with frames A, suitably connected, oscillating frames B, having bearings in the upper portions of frame A, of knife-frame D, knife E, and means for giving said knife-frame and knife a vertical adjustment.

5. The combination, in a knife-carrier head of a stereotype-shaving machine with frames A, screw-threaded shaft F, having bearings in said side frames, A, boss $e$, having head $f$, of the knife and knife-frame D, said knife frame D having an oblique recess in its rear surface for the reception of heads F.

6. The combination, with a knife-carrier head, oscillating knife-frame, and a knife, of the rods G and bearings H, having a tight packing or bushing therein.

In testimony that I claim the foregoing as my own I hereunto affix my signature in presence of two witnesses.

EDWARD A. BLAKE.

Witnesses:
 JAMES H. COYNE,
 FRANK D. THOMASON.